(12) United States Patent
Morita et al.

(10) Patent No.: US 8,147,132 B2
(45) Date of Patent: Apr. 3, 2012

(54) FREEZING DETECTION METHOD FOR FUEL CELL

(75) Inventors: Akira Morita, Kawasaki (JP); Jun Yamamoto, Tokyo (JP); Kazuyuki Ueda, Tokyo (JP); Taihei Mukaide, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 662 days.

(21) Appl. No.: 12/390,803

(22) Filed: Feb. 23, 2009

(65) Prior Publication Data

US 2009/0213896 A1   Aug. 27, 2009

(30) Foreign Application Priority Data

Feb. 27, 2008 (JP) ................................. 2008-046238

(51) Int. Cl.
*G01N 25/02* (2006.01)
(52) U.S. Cl. ........................................................ 374/16
(58) Field of Classification Search ...................... 374/16
See application file for complete search history.

(56) References Cited

U.S. PATENT DOCUMENTS

| 7,223,490 | B2 | 5/2007 | Hayashi et al. | |
| 7,572,529 | B2* | 8/2009 | Kato et al. | 429/438 |
| 2009/0110970 | A1* | 4/2009 | Tejima | 429/13 |
| 2011/0269040 | A1* | 11/2011 | Bradean et al. | 429/429 |

FOREIGN PATENT DOCUMENTS

| JP | 2002-313391 A | 10/2002 |
| JP | 2005-142022 A | 6/2005 |

* cited by examiner

*Primary Examiner* — Lisa Caputo
*Assistant Examiner* — Jamel Williams
(74) *Attorney, Agent, or Firm* — Fitzpatrick, Cella, Harper & Scinto

(57) ABSTRACT

In a method for detecting the freezing of water within a fuel cell, precise detection can be performed using a phenomenon specific to the time when water starts to freeze to allow a reduction in erroneous activation. Detection at an early stage after the start of freezing is allowed, and hence measures can be taken against an output reduction before the water within the fuel cell completely freezes.

10 Claims, 6 Drawing Sheets

FREEZING DETECTION METHOD FOR FUEL CELL

BACKGROUND OF THE INVENTION

1. Field of the Invention

The present invention relates to a freezing detection method for a fuel cell. More particularly, the present invention relates to a freezing detection method for detecting a change in one of an output voltage of a fuel cell, an output current thereof, cell resistance, cell temperature, and cell fastening pressure to enable more prompt and reliable detection of the start of the freezing of water within a fuel cell unit compared with a conventional detection method.

2. Description of the Related Art

When a fuel cell is used under a low-temperature environment, water generated within the fuel cell may freeze. Depending on a place where freezing occurs, reaction gas intake becomes difficult, which leads to problems such that a sudden output drop gives damage to a connection device, and adversely affects a member constituting the fuel cell. Accordingly, in the case of mounting the fuel cell in an automobile and a portable device which may be used under a low-temperature environment, there is required a method which enables, when water within the fuel cell starts to freeze, prompt and precise detection of freezing within the fuel cell before the whole fuel cell freezes.

As a method for preventing the freezing of a fuel cell, there is a conventional method which constantly monitors an outside air temperature, and activates a heating unit when the outside air temperature reaches a level under a freezing point. However, because a fuel cell generates heat through power generation, the fuel cell does not freeze momentarily after reaching a level under the freezing point. In addition, because an amount of generated heat depends on the situation of the time in which power is generated, a temperature at which the freezing starts sequentially varies. That is, in the method, the heating unit is activated even in a non-freezing situation, an energy loss increases. Accordingly, an energy efficiency can be increased if the method is improved so as to take measures after detecting the start of freezing. For example, as described in Japanese Patent Application Laid-Open No. 2002-313391, there is proposed a method in which a heating unit is activated when an output voltage is low, and the heating unit is halted when the output voltage is high. On the other hand, Japanese Patent Application Laid-Open No. 2005-142022 proposes a method in which a fuel cell is determined to freeze when, at an outside air temperature under the freezing point, a cell resistance gradually decreases before abruptly increases.

However, as the cause of changes in cell resistance and output power, various factors can be considered, such as load fluctuations, a dry-out phenomenon in which an electrolyte membrane dries, and a flooding phenomenon in which generated water clogs a supply path for a reaction gas.

That is, with the conventional technology described above, it is difficult to distinguish phenomena other than freezing as described above from real freezing so that it is difficult to precisely detect freezing. Consequently, the conventional technology had the problem that waste of energy may occur due to a malfunction such as the activation of a heating unit in the event of a phenomenon other than freezing.

SUMMARY OF THE INVENTION

The present invention is directed to a method which assumes that a phenomenon specific to the time when water starts to freeze is a detection target to promptly and precisely detect the freezing of water within a fuel cell.

The present invention provides a freezing detection method for a fuel cell having the following features.

The freezing detection method for a fuel cell unit for detecting a start of freezing of water within the fuel cell unit, the method includes:

a first step of determining whether or not at least one of a time differential value of an output measurement value of the fuel cell unit and a secondary time differential value thereof is a positive predetermined value or more; and a second step of determining, when at least one of the time differential value of the output measurement value and/or the secondary time differential value thereof is the positive predetermined value in the first step, whether or not at least one of the time differential value of the output measurement value and the secondary time differential value thereof subsequently change to a negative value.

According to the present invention, a phenomenon specific to the time when the water within the fuel cell unit starts to freeze is detected, whereby a prompt and precise detection of the freezing of the fuel cell unit is enabled. As a result, there can be provided a freezing detection method for a fuel cell with a less malfunction and a less energy loss. By utilizing the present invention, it is possible to provide a fuel cell in which damage to a device resulting from a sudden output drop of the output due to freezing can be reduced, and in which degradation due to repeated freezing is suppressed.

Further features of the present invention will become apparent from the following description of exemplary embodiments with reference to the attached drawings.

DESCRIPTION OF THE EMBODIMENTS

A freezing detection method for a fuel cell according to the present invention is a freezing detection method for detecting, based on a change in output measurement value, that water within a cell freezes during power generation in an environment where an outside air temperature is under a freezing point. The output measurement values mentioned herein include individual measurable parameters such as an output voltage, an output current, a cell resistance, a cell temperature, and a cell fastening pressure. Among those parameters, at least one is used.

The embodiments of the present invention are described.

Figure 1:
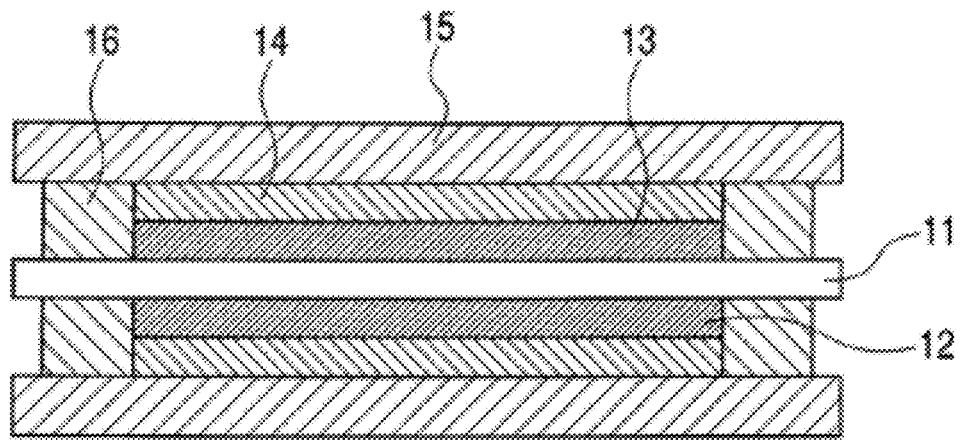
FIG. 1 is a schematic cross-sectional view of a fuel cell.
Figure 2:
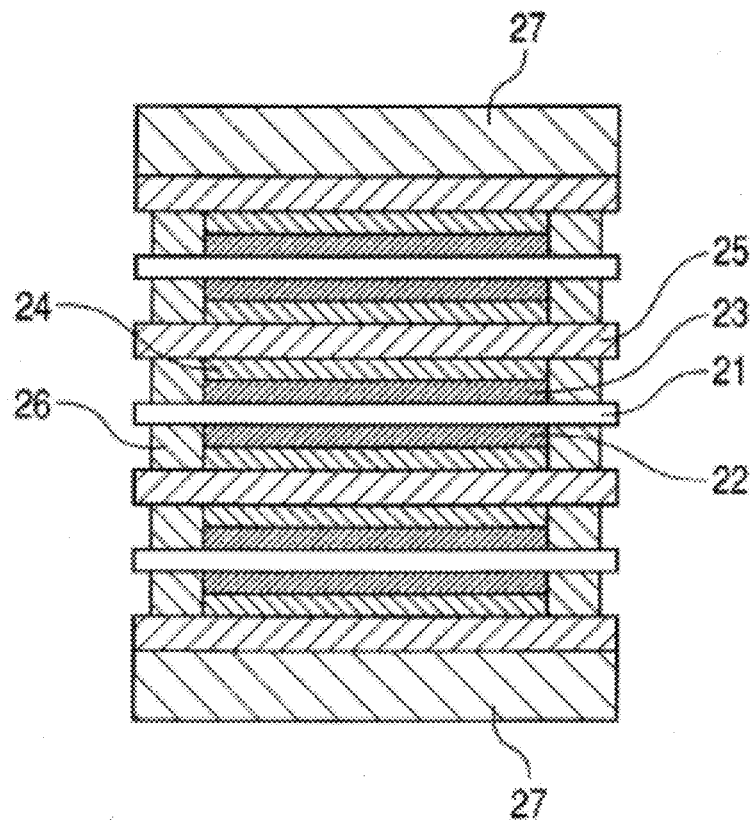
FIG. 2 is a schematic cross-sectional view of a fuel cell stack.

First, a structure of a fuel cell is described. Although a polymer electrolyte fuel cell is used herein as an example, the present invention is not limited thereto, and can be appropriately used also to another type of fuel cell. FIG. 1 is a schematic cross-sectional view of the fuel cell. FIG. 2 is a schematic cross-sectional view illustrating an example of a fuel cell stack.

In FIGS. 1 and 2, as each of electrolyte membranes 11 and 12, there is used, e.g., a proton conductive polymer material, specifically one of a perfluorcarbon-based ion exchange film, a non-perfluoro-based ion exchange film, and a hybrid-based ion exchange film is used.

Examples of fuel electrodes 12 and 22 and oxidizer electrodes 13 and 23 include one obtained by making carbon powder carrying fine platinum particles into a paste with the proton conductive polymer material, and forming the paste on the surfaces of the electrolyte membranes 11 and 12 by screen printing. The present invention is not particularly limited to the materials and the method described above.

In each of the fuel electrodes 12 and 22, the fuel is dissociated into protons and electrons under the action of a catalyst contained in each of the fuel electrodes 12 and 22. As the fuel, a gas such as hydrogen, or a liquid such as methanol or ethanol is typically used. The protons generated in each of the fuel electrodes 12 and 22 moves in the electrolyte membranes 11 and 21 in a state where the protons are hydrated with water molecules present in the electrolyte membranes 11 and 21. On the other hand, the electrons are extracted from an extraction electrode to the outside to flow in a load circuit.

In each of the oxidizer electrodes 13 and 23, the protons, the electrons, and an oxidizer react with each other under the action of a catalyst contained in each of the oxidizer electrodes 13 and 23 to generate water. A part of energy generated by a sequential chemical reaction is utilized as electric energy. As the oxidizer, oxygen in an ambient atmosphere is typically used. The water generated by a power generation reaction normally moves in the form of water vapor or liquid water together with a flow of the oxidizer from the oxidizer electrodes to be discharged to the outside. Alternatively, the water may pass through the electrolyte membranes 11 and 21 to be discharged from the fuel electrodes 12 and 22.

Accordingly, as more oxygen in the ambient atmosphere exists in the oxidizer 13 and 23, the oxidation of the protons is easier, and the power generation reaction is more active. If water generated in the oxidizer electrodes 13 and 23 freezes in an environment under the freezing point, the generated ice inhibits a supply of the oxidizer so that the power generation reaction becomes difficult. Once the water within the fuel cell starts to freeze, it is necessary to stop the freezing of the water before the ice completely prohibits the supply of the oxidizer.

Gas diffusion layers 14 and 24 perform the function of smoothing the intake of the reaction gas as well as the discharge of the generated water. As a material for the gas diffusion layers 14 and 24, carbon paper and carbon felt obtained by graphitizing porous sintered carbon and a thermosetting resin at a high temperature can be used. Alternatively, there can also be used a structure having a microporous layer which is formed by applying an ink as a mixture of a fluorine resin and carbon black particles to carbon cloth, which is produced by knitting carbon fiber and subjected to a water repellent treatment using a fluorine resin.

In each of collectors 15 and 25, a flow path along which the reaction gas flows is formed, and a metal plate obtained by plating SUS with gold and a plate obtained by molding fine carbon particles with a resin can be used.

As sealing members 16 and 26, a gasket made of rubber such as silicon rubber or viton rubber, or various adhesives including a hot-melt type one can be used.

An end plate 27 is for fixing a stack on both sides thereof with a fixing member (not shown) to hold the structure of the stack, while applying a cell fastening pressure to each of cells constituting the stack. For the end plate 27, any material can be used as long as the material meets the purpose thereof, and a metal such as SUS and a resin material having a high strength can be suitably used.

Figure 3:
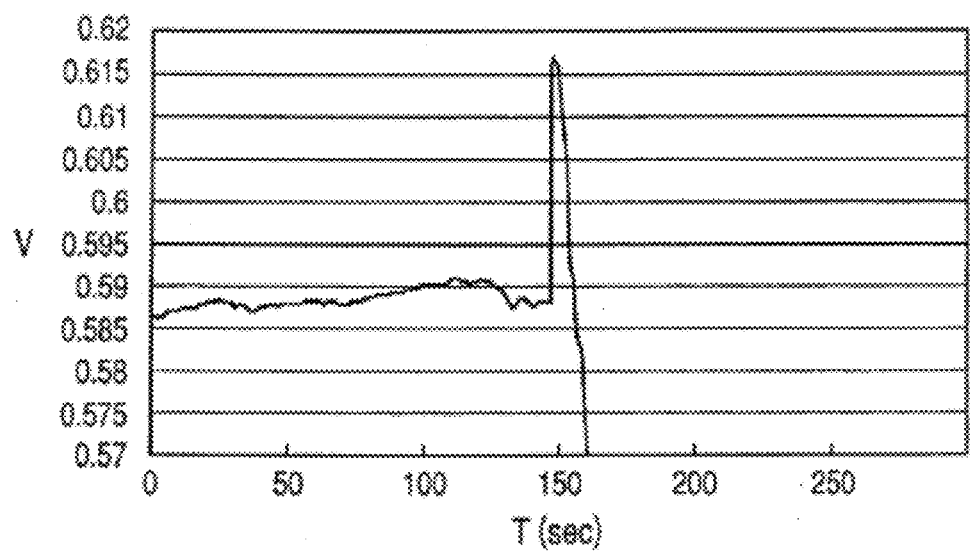
FIG. 3 is a graph representing a change in output voltage when water within the fuel cell starts to freeze.

FIG. 3 illustrates an example of a change in output voltage when water within the fuel cell unit starts to freeze when a load is applied to the fuel cell with a constant current.

The inventors of the present invention found that, when the water within the fuel cell starts to freeze, the output voltage of the fuel cell temporarily rises rapidly, and then abruptly drops, as illustrated in FIG. 3. Conceivably, this may occur under the influence of volume expansion and heat of solidification resulting from a water behavior such that, even at a temperature under the freezing point, the water generated within the fuel cell remains existing in a liquid state, i.e., in a so-called supercooled state till immediately before freezing, and starts to freeze when triggered by any factor. That is, the output of the fuel cell temporarily rises due to a reduction in the contact resistance of the fuel cell unit caused by the volume expansion when the water in the supercooled state freezes, or due to a rise in the temperature of the fuel cell unit caused by the emission of the heat of solidification. Thereafter, as the area occupied by the water which changes into the ice increases within the fuel cell, the intake of the oxidizer gas such as air by the oxidizer electrode becomes gradually more difficult, so that the output voltage drops. The phenomenon is a change in output voltage which is specific to the time when freezing starts.

Figure 4:
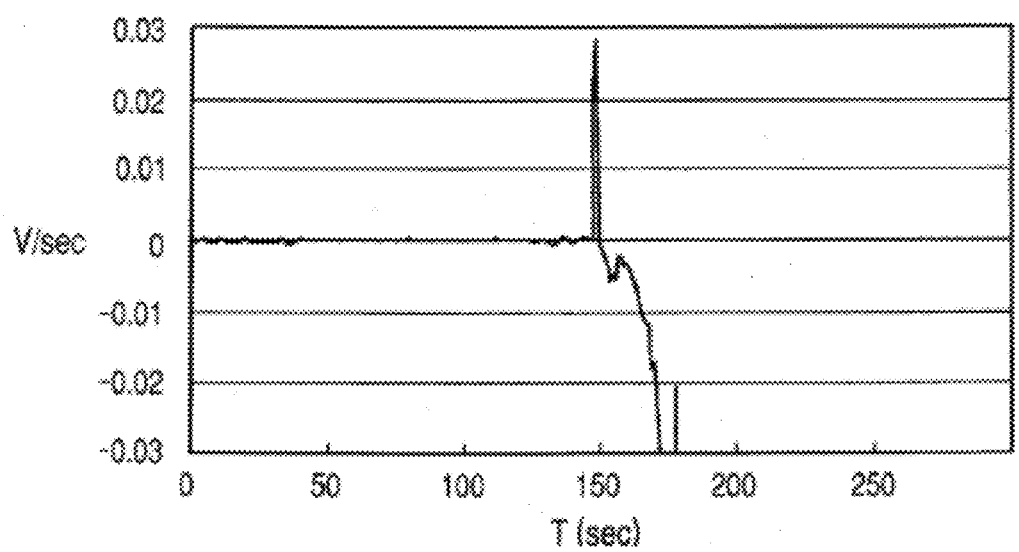
FIG. 4 is a graph representing a change in the differential value of the output voltage when the water within the fuel cell starts to freeze.

FIG. 4 is a graph representing a value obtained by differentiating the output voltage of FIG. 3 with respect to time. When the water within the fuel cell starts to freeze, the time differential value of the output voltage temporarily increases, and then abruptly shifts to the negative side. Accordingly, when the time differential value of the output voltage changes to a value not less than a positive predetermined value, it is determined whether or not the time differential value subsequently changes to a negative value to enable the determination of whether or not freezing starts.

Figure 5:
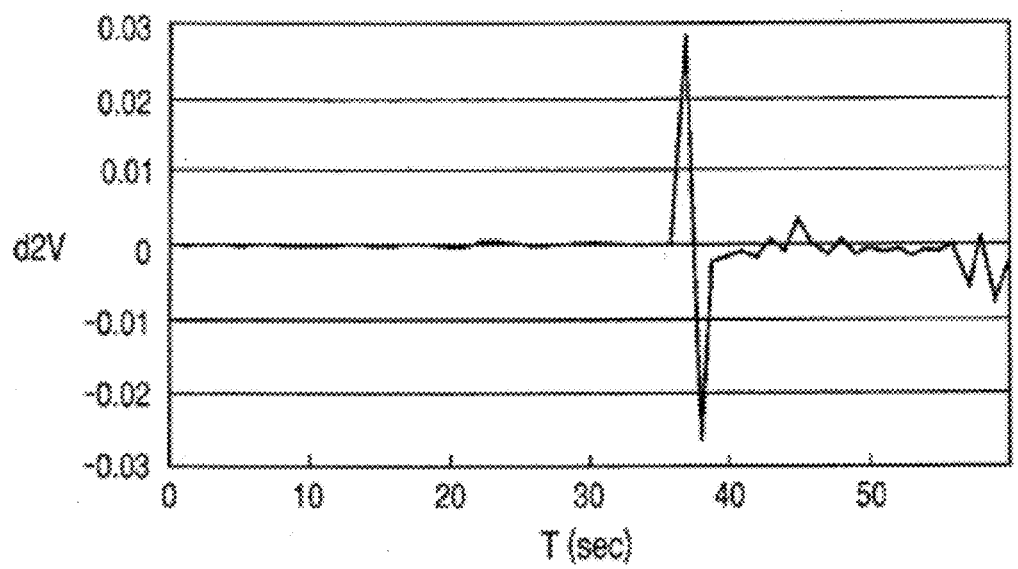
FIG. 5 is a graph representing a change in the secondary differential value of the output voltage when the water within the fuel cell starts to freeze.

FIG. 5 is a graph representing a secondary time differential value of the output voltage obtained by further differentiating the time differential value of FIG. 4 with respect to time. When the water within the fuel cell starts to freeze, the secondary time differential value of the output voltage initially increases, then decreases, and increases again in the negative range to return to a value around zero. Accordingly, similarly to the time differential value, when the secondary differential value of the output voltage changes to a value not less than a positive predetermined value, it is also determined whether or not the time differential value subsequently changes to a negative value to enable the determination of whether or not freezing starts, in the same manner as with the time differential value.

The start of freezing can also be detected by individually using one of the above-mentioned time differential value of the output voltage and the above-mentioned secondary time differential value thereof alone. However, for more precise detection, it can also be determined that freezing starts only when both of the time differential value and the secondary time differential value satisfy criteria for determination.

When precision is further pursued, there may be added a third step of determining whether or not the time differential value of the output voltage and the secondary time differential value thereof change to negative values and then reach values not more than negative predetermined values.

As the time for determining the start of freezing, different times in different steps may be used selectively and appropriately depending on the structure of a target fuel cell system. For example, when the size of the fuel cell system is not limited, all the steps may be used appropriately in order to increase precision. When the fuel cell system is to be reduced in size, the minimum required steps may be performed appropriately in order to reduce a measurement system.

It is necessary to distinguish a change in output voltage indicating the start of freezing from a change resulting from noise. As a result of conducting intensive study on fuel cells with various sizes and shapes, the inventors of the present invention have concluded that, as long as a change of not less than ±5 mV/sec and a change of not less than ±5 mV/sec$^2$ are used as respective criteria for determination for the time differential value and the secondary time differential value, the change indicating the start of freezing can be distinguished from noise in almost all cases.

Figure 6:
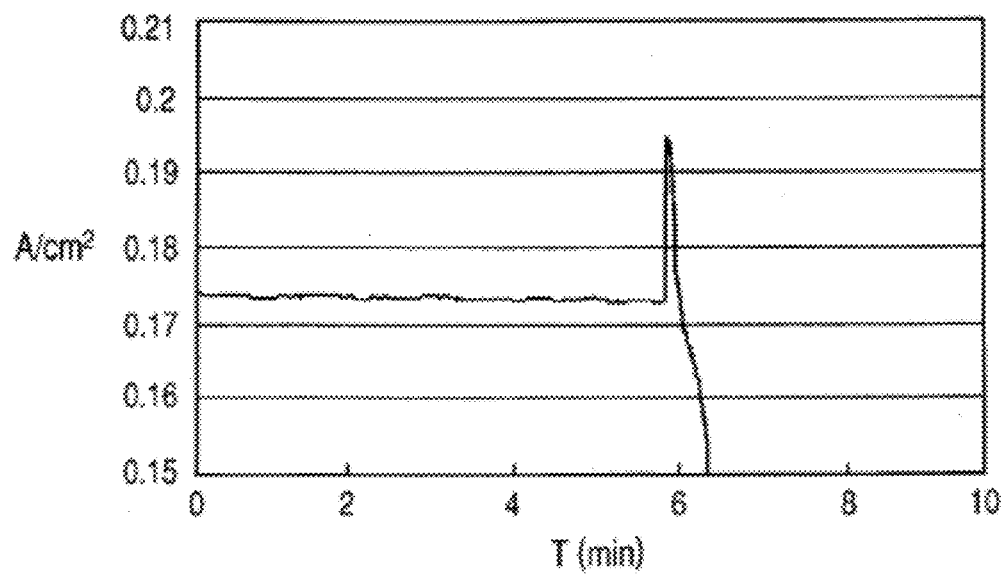
FIG. 6 is a graph representing a change in output current when the water within the fuel cell starts to freeze.

FIG. 6 illustrates an example of a change in output current when the water within the fuel cell unit starts to freeze when a load is applied to the fuel cell with a constant voltage.

Similarly to the output voltage, the output current also temporarily increases, and then decreases when water in the supercooled state freezes. In each of the time differential value and the secondary time differential value also, the same change as occurring in output voltage occurs when freezing starts. Therefore, the change in output current can also be used to detect freezing. As a result of conducting sequential study, the inventors of the present invention concluded that, as long as a change of not less than ±5 mA/sec and a change of not less than ±5 mA/sec$^2$ are used as respective criteria for determination for the time differential value of the output current and the secondary time differential value thereof, a change in output current indicating the start of freezing can be distinguished from noise in almost all cases.

Figure 7:
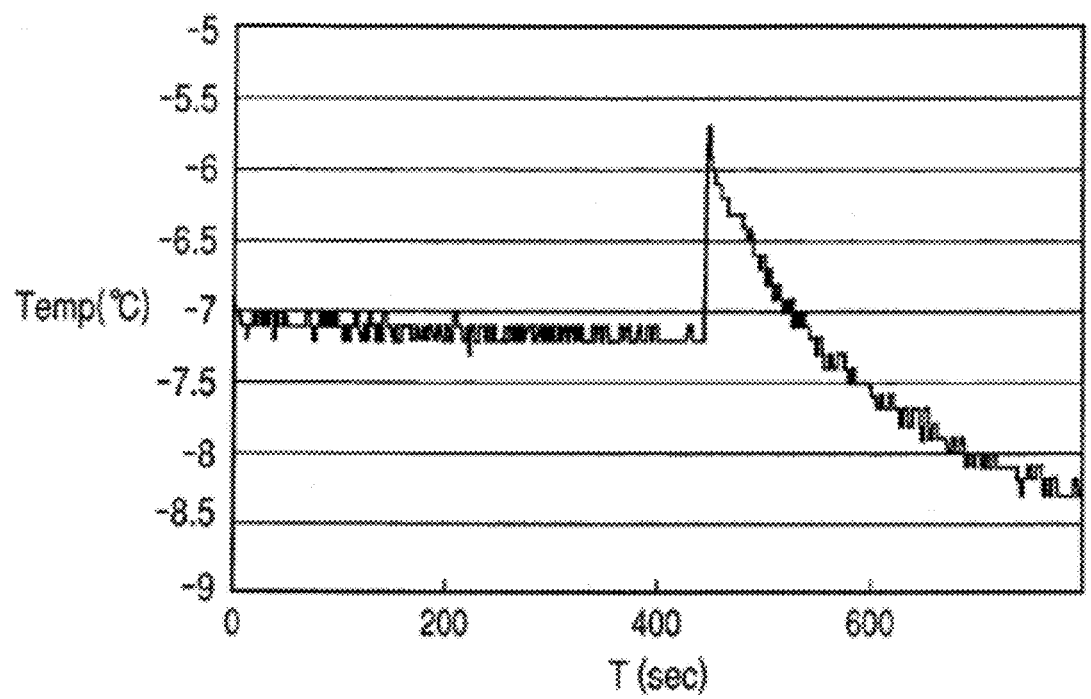
FIG. 7 is a graph representing a change in cell temperature when the water within the fuel cell starts to freeze.

FIG. 7 illustrates an example of a change in cell temperature when the water within the fuel cell unit starts to freeze when the fuel cell is driven in an environment under the freezing point.

When the water within the fuel cell freezes, heat of solidification is emitted as a result of the freezing of the water in the supercooled state. As a result, similarly to the output voltage and the output current, as illustrated in FIG. 7, the cell temperature also temporarily rises, and then drops because the cell is cooled by the outside air temperature. Regarding the time differential value of the cell temperature and the secondary time differential value thereof also, the same changes as occurring in output voltage and output current occur when freezing starts. Therefore, the cell temperature can also be measured and used to detect freezing in the same manner as the output voltage and the output current are used. The inventors of the present invention concluded that, as long as a change of not less than ±0.2° C./sec and a change of not less than ±0.2° C./sec$^2$ are used as respective criteria for determination for the time different value of the cell temperature and the secondary time differential value thereof, a change in cell temperature indicating the start of freezing can be distinguished from noise in almost all cases. The measurement of the cell temperature can be performed at a place as close as possible to the electrolyte membrane. As a method for measuring the cell temperature, a typical method using a thermocouple and a thermistor can be listed.

As described above, when the water within the fuel cell unit freezes, volume expansion or the emission of heat of solidification occurs, and the cell resistance lowers under the influence of a reduction in contact resistance caused by the volume expansion and an increase in the proton conductivity of the electrolyte membrane caused by a temperature rise. Due to the reduction in cell resistance, the above-mentioned changes in output voltage and output current appear. A change in cell resistance caused by the start of the freezing of the fuel cell unit is larger in the amount of change per unit time than other changes including a change in resistance due to the wet condition of the electrolyte membrane and a change in cell resistance due to degradation. Accordingly, when the cell resistance is measured to be determined that the measured value decreases by an amount not less than a predetermined amount of change, and that the time differential value further reaches a predetermined value, it can be determined that the freezing of the cell starts. Further, in order to enhance precision, the determination of a positive or negative time differential value and a secondary time differential value can also be used for the cell resistance in the same manner as used for the other parameters. Among changes in cell resistance, in order to distinguish a change resulting from freezing from a change resulting from noise, a change of 5 mΩ, a change of not less than ±5 mΩ/sec, and a change of not less than ±5 mΩ/sec$^2$ may be used appropriately as respective criteria for determination for the predetermined amount of change of the cell resistance, the time differential value thereof, and the secondary time differential value thereof. As a method for measuring the cell resistance, a generally known method can be used. For example, a current interruption method, an alternating current impedance method, and a step method, can be listed.

When the water within the fuel cell freezes, a cell fastening pressure increases due to the volume expansion of the water. In general, the fastening pressure of the fuel cell unit may be reduced by the loosening of a screw used for fastening, but does not increase as long as a force from the outside is not applied. Therefore, when the cell fastening pressure increases by an amount not less than a predetermined amount of change, it can be determined that the water within the fuel cell starts to freeze. As a result of repeatedly making detailed examination on the value of the predetermined amount of change, the inventors of the present invention found that, as long as a change of 10 kPa is used as a criterion for determination, a change resulting from freezing can be distinguished from noise in almost all cases regardless of the size and shape of the fuel cell unit. After the water within the fuel cell completely freezes, the cell fastening pressure is held constant till the ice melts to return to water. As a method for measuring the fastening pressure, a generally known method can be used. For example, a method which uses a piezoelectric element or a strain gauge can be listed.

Figure 8:
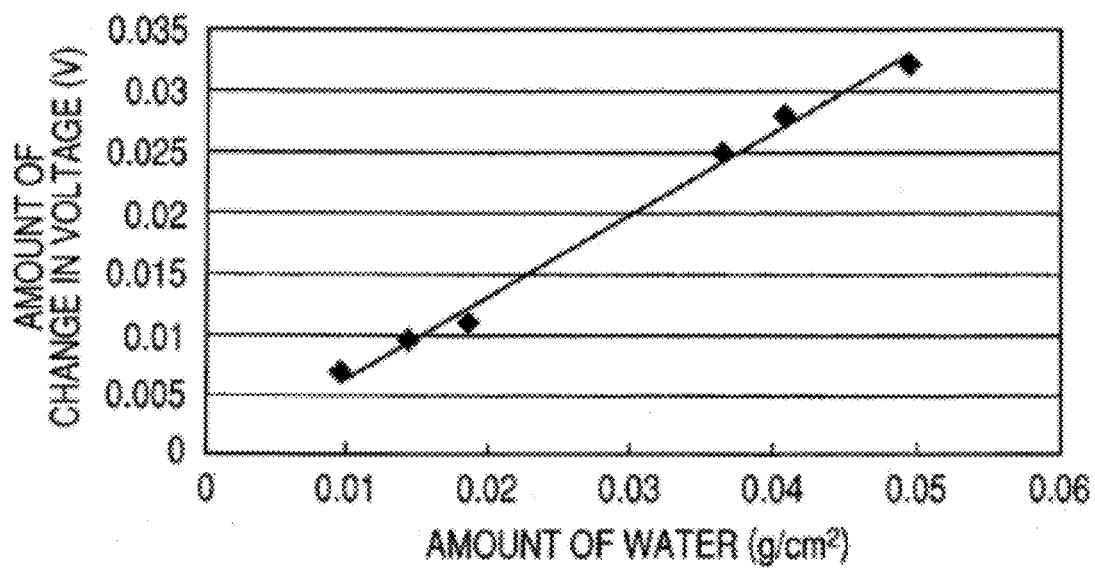
FIG. 8 is a graph representing the relationship between an amount of the change in output voltage and an amount of water within the fuel cell when the water within the fuel cell starts to freeze.

As a result of further making detailed examination on those detection methods, the inventors of the present invention found that there are correlations between the amount of the water within the fuel cell and the range of the change of each parameter. FIG. 8 is a graph illustrating the relationship between the amount of the water within the fuel cell and the amount of change of the output voltage. From FIG. 8, it is understood that, as the amount of the water within the fuel cell unit represented by the abscissa axis increases, the amount of change of the voltage at the start of freezing increases.

Therefore, by calculating the amount of the water within the fuel cell from a cumulative amount of generated power, the amount of change of each parameter can be estimated. By setting a predetermined amount of change of each parameter based on the estimated value, and examining whether or not the change of not less than the predetermined amount of change has occurred, a more precise determination can be made, and false activation can be prevented. The method of recognizing the amount of the water within the fuel cell is not limited to the method of calculating the amount of generated water from the amount of generated power. The amount of the water within the fuel cell unit may also be actually measured using a humidity sensor.

Thus far, two methods which are the method of setting the predetermined amount of change in advance as described above, and the method of changing the predetermined amount of change according to the amount of the water within the fuel cell have been listed. However, whether either one of the two methods is to be selected or the two methods are to be used in combination is determined appropriately according to the specifications of the target fuel cell. That is, when the fuel cell is used as a power supply for a portable device, reduction in size is required, and a system for determining the amount of change of the water within the fuel cell may not be mounted desirably. In such a case, the method of setting the predetermined amount of change in advance can be used. On the other hand, when more precise detection of freezing is required for cold district specifications, the method of changing the predetermined amount of change according to the amount of the water within the fuel cell can be used.

In order to enhance the preciseness of freezing detection, it is more effective to use respective changes in a plurality of parameters in combination.

Hereinbelow, the examples of the present invention will be described.

EXAMPLE 1

First, a membrane electrode assembly (MEA) obtained by bonding 2 cm squares of platinum black as the catalyst layers 12 and 13 to both sides of a Nafion (registered trademark of Du Pont Kabushiki Kaisha) as the electrolyte 11 by a hot press was prepared. Then, both sides of the MEA were sandwiched between carbon cloth pieces each as the gas diffusion layer 14, and further sandwiched the MEA from the outside between the collectors 15 obtained by plating SUS with gold and formed with the reaction gas flow paths so as to be fastened. In this manner, a fuel cell as illustrated in FIG. 1 was produced.

Figure 9:
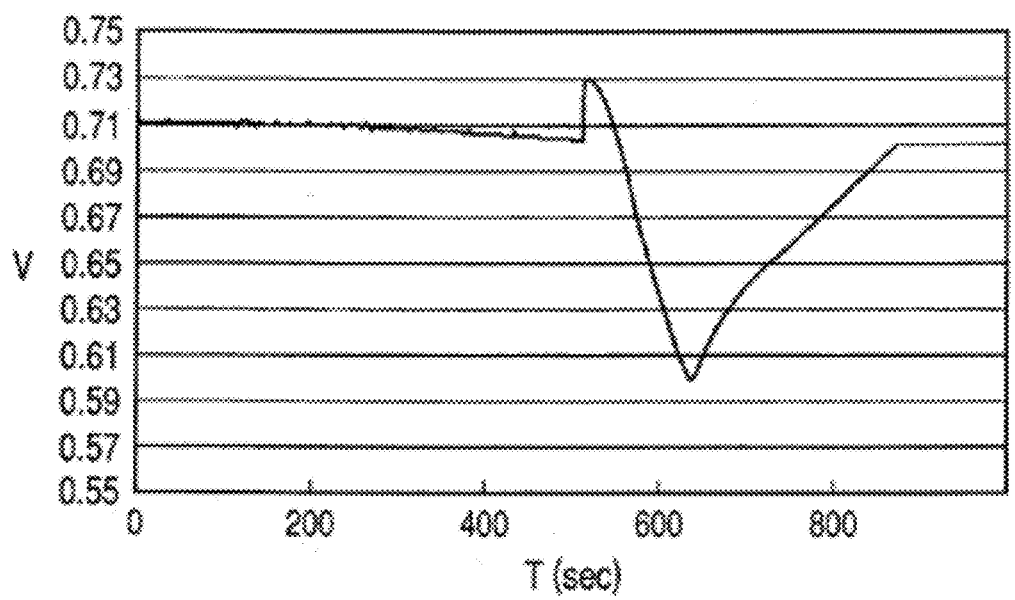
FIG. 9 is a graph representing a change in the output voltage of the fuel cell in the case where the freezing is detected using a freezing detection method according to the present invention, and then a heating unit is activated in Example 1.

The fuel cell thus produced was placed in an environment tester, and held in a constant atmosphere at −15° C. for a period of one hour or more. Then, power generation was started with a constant current of 50 mA/cm$^2$. After the power generation was continued for a while, a rise in voltage was observed at a certain time, as illustrated in FIG. 9. The change in voltage indicates that freezing had started within the fuel cell. According to the criterion for determining the start of freezing in the present invention, at the time when the differential value of the output voltage changed to a value not more than −5 mV/sec (second step) after reaching the value not less than 5 mV/sec (first step), the fuel cell was heated using a heating unit. After heating was performed, the output voltage that had temporarily dropped was gradually recovered to enable the power generation to be continued, as shown in FIG. 9.

EXAMPLE 2

Using the same fuel cell as used in Example 1, the same test as conducted in Example 1 was conducted except that freezing was detected using the secondary differential value of the output voltage instead of the differential value thereof. That is, at the time when the secondary differential value of the output voltage reached a value not more than −5 mV/sec$^2$ (second step) after reaching the value not less than 5 mV/sec$^2$ (first step), the fuel cell was heated using a heating unit. In this case also, after heating was performed, the output voltage that had temporarily dropped was gradually recovered to enable the power generation to be continued.

EXAMPLE 3

Figure 10:
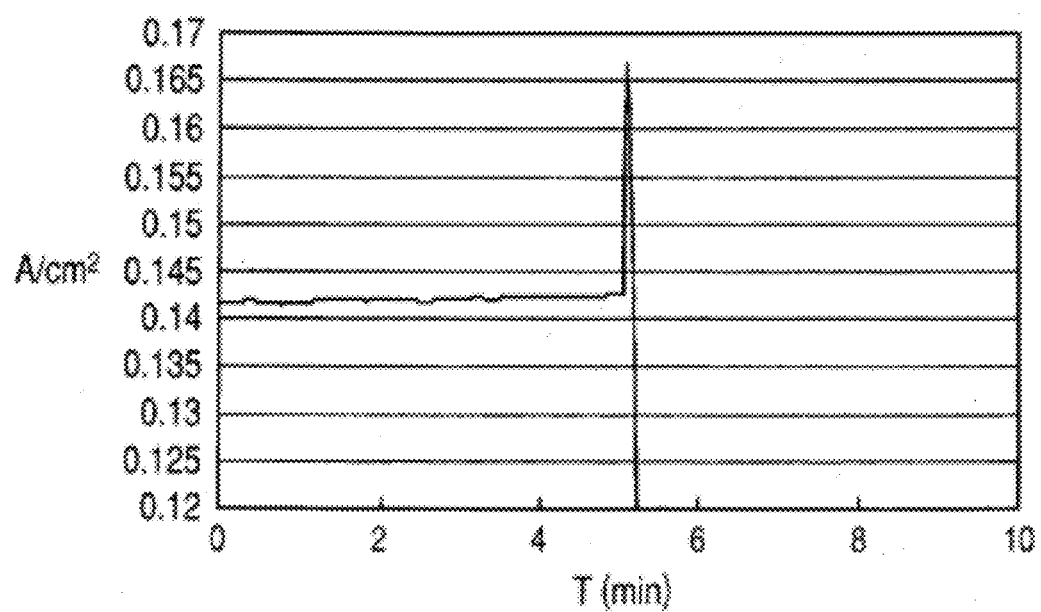
FIG. 10 is a graph representing changes in output current before and after the fuel cell stack starts to freeze in Example 2.
Figure 11:
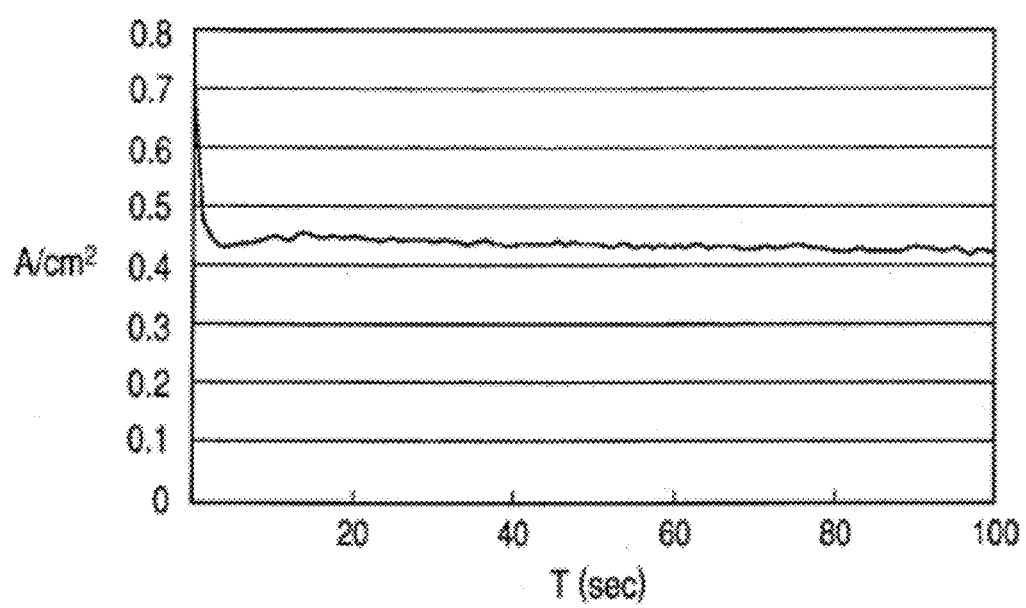
FIG. 11 is a graph representing a change in output current when the fuel cell stack is short-circuited after the freezing of the fuel cell stack is detected using the freezing detection method according to the present invention in Example 2.

In Example 3, the fuel cells produced in Example 1 were stacked in a 3-cell series configuration to produce a fuel cell stack as shown in FIG. 2. Then, in the same manner as in Example 1, the fuel cell stack was placed in an environment tester, and allowed to stand in an atmosphere at −15° C. for a period of one hour or more. Thereafter, power generation was started with a constant voltage of 2.4 V. After the power generation was performed for a given period of time, a change in current indicating that freezing had started within the stack as illustrated in FIG. 10 appeared. At the time when the differential value of the output current changed to a value not more than −5 mA/sec after reaching the value not less than 5 mA/sec and when the secondary differential value of the output current reached a value not more than −5 mA/sec$^2$ after reaching the value not less than 5 mA/sec$^2$, the fuel cell was connected to a short circuit, and short-circuited. FIG. 11 represents the transition of the current value after the fuel cell was short-circuited. As illustrated in FIG. 11, by short-circuiting the fuel cell, power generation could be continued without completely freezing the inside of the fuel cell.

COMPARATIVE EXAMPLE

Figure 12:
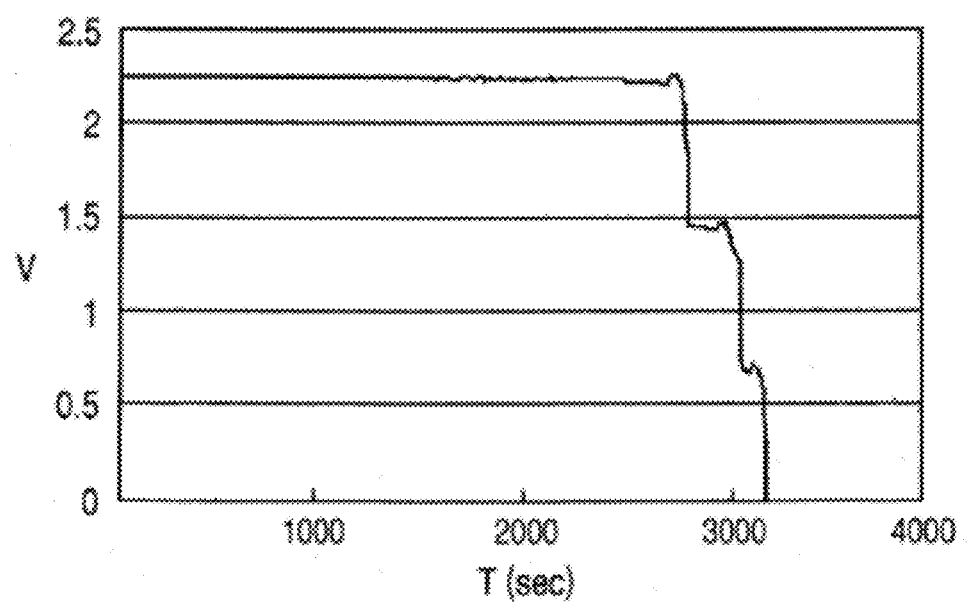
FIG. 12 is a graph representing a change in output voltage when a fuel cell stack freezes in Comparative Example.

In Comparative Example, a fuel cell stack having the same structure as that of the fuel cell stack used in Example 3 was used. After the fuel cell stack was held in a constant test environment at −15° C. for a period of one hour or more in the same manner as in Example 3, power generation was performed with a constant current of 100 mA. In the same manner as in Example 1, a rise in voltage indicating that freezing has started within the cell was observed. In Comparative Example, even when the change in voltage was observed, a procedure for continuing the power generation was not performed instantly. Instead, after the output voltage had dropped to 0 V as illustrated in FIG. 12, the fuel cell was connected to a short circuit, and short-circuited in an attempt to continue power generation. However, after the output voltage had dropped to 0 V, the power generation could not be continued even when the fuel cell was short-circuited because the inside of the fuel cell had completely frozen.

From those results, it is understood that, by using the freezing detection method according to the present invention, a procedure of promptly recovering the output can be performed before the fuel cell freezes to fall into an inoperable state, and that power generation can be thereby continued.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-046238, filed Feb. 27, 2008, which is hereby incorporated by reference in its entirety.

What is claimed is:

1. A freezing detection method for a fuel cell unit for detecting a start of freezing of water within the fuel cell unit, comprising:
   a first step of determining whether or not at least one of a time differential value of an output measurement value of the fuel cell unit and a secondary time differential value thereof is a positive predetermined value or more; and
   a second step of determining, when at least one of the time differential value of the output measurement value and the secondary time differential value thereof is the positive predetermined value in the first step, whether or not at least one of the time differential value of the output measurement value and the secondary time differential value thereof subsequently change to a negative value.

2. The freezing detection method for a fuel cell unit according to claim 1, further comprising, after the second step, a third step of determining whether or not at least one of the time differential value of the output measurement value and the secondary time differential value thereof is a negative predetermined value or less.

3. The freezing detection method for a fuel cell unit according to claim 1, wherein the output measurement value is at least any one of a voltage, a current, and a cell temperature.

4. The freezing detection method for a fuel cell unit according to claim 3, wherein the output measurement value in the first step is a voltage, and the positive predetermined value of the time differential value and the positive predetermined value of the secondary time differential value are 5 mV/sec and 5 mV/sec$^2$, respectively.

5. The freezing detection method for a fuel cell unit according to claim 2, wherein the negative predetermined value of the time differential value and the negative predetermined value of the secondary time differential value in the third step are −5 mV/sec and −5 mV/sec$^2$, respectively.

6. The freezing detection method for a fuel cell unit according to claim 3, wherein the output measurement value in the first step is a current, and the positive predetermined value of the time differential value and the positive predetermined value of the secondary time differential value are 5 mA/sec and 5 mA/sec$^2$, respectively.

7. The freezing detection method for a fuel cell unit according to claim 2, wherein the negative predetermined value of the time differential value and the negative predetermined value of the secondary time differential value in the third step are −5 mA/sec and −5 mA/sec$^2$, respectively.

8. The freezing detection method for a fuel cell unit according to claim 3, wherein the output measurement value in the first step is a cell temperature, and the positive predetermined value of the time differential value and the positive predetermined value of the secondary time differential value are 0.2° C./sec and 0.2° C./sec$^2$, respectively.

9. The freezing detection method for a fuel cell unit according to claim 2, wherein the negative predetermined value of the time differential value and the negative predetermined value of the secondary time differential value in the third step are −0.2° C./sec and −0.2° C./sec$^2$, respectively.

10. The freezing detection method for a fuel cell unit according to claim 1, further comprising, determining whether or not the output measurement value changes by an amount not less than a predetermined amount of change which is determined according to an amount of the water within the fuel cell unit.

* * * * *